Feb. 11, 1941. W. D. SMITH 2,231,512
CLAMP
Filed May 8, 1939

Inventor
Wallace D. Smith
By Lyon & Lyon
Attorneys

Patented Feb. 11, 1941

2,231,512

UNITED STATES PATENT OFFICE 2,231,512

CLAMP

Wallace D. Smith, San Diego, Calif., assignor to Solar Aircraft Company, San Diego, Calif., a corporation of California Application May 8, 1939, Serial No. 272,470

3 Claims. (Cl. 285—193)

This invention relates to clamps of the band type adapted to encircle cylindrical members and is particularly useful in connection with sectional conduits, for securing the ends of adjacent conduit sections together.

An object of the invention is to provide a clamp that is strong, yet light in weight and inexpensive to manufacture.

Another object is to provide a clamp that may be readily set to a desired diameter and permanently locked to retain that diameter.

Other more specific objects and features of the invention will become apparent from the following detailed description of one embodiment thereof, with reference to the drawing, in which Fig. 1 is a cross section through a conduit enclosed with a clamp in accordance with the invention, the clamp being shown in end elevation;

Figure 1:
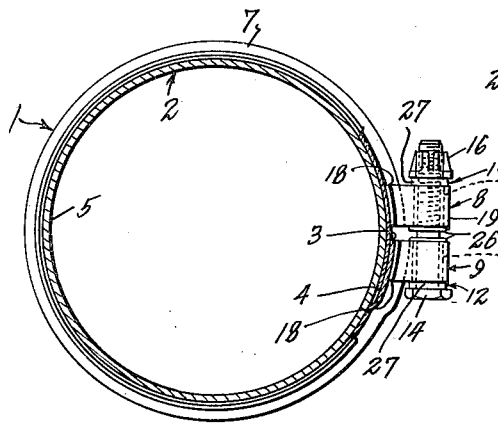
Figure 2:
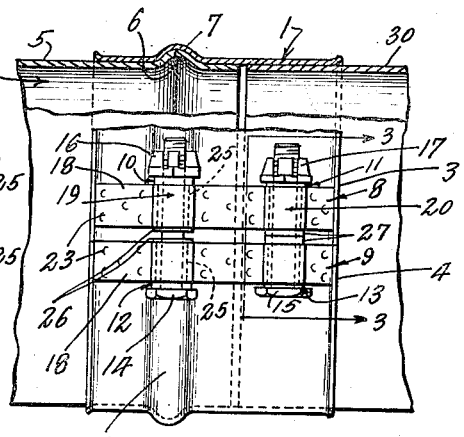
Fig. 2 is a side elevation view of the conduit and clamp, with portions broken away to show the construction.
Figure 4:
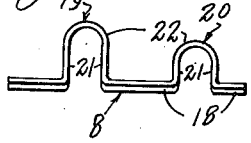
Fig. 4 is a side edge view.
Figure 5:
Fig. 5 is an end view of one of the yoke members of the clamp.
Figure 6:
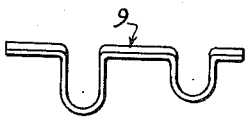
Fig. 6 is a side edge view.
Figure 7:
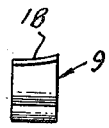
Fig. 7 is an end view, of the other yoke member of the clamp.

Referring first to Figs. 1 and 2, my clamp comprises a band 1 of sheet metal adapted to encircle a cylindrical object 2 and is preferably of peripheral length somewhat greater than the circumference of the object to be encircled so that the ends of the band 1 overlap. As shown in Fig. 1, one end 3 of the band is shown exterior of and overlapping the other end 4.

In the particular form shown, the clamp is intended for use with two pipes (constituting the member 2), one pipe 5 of which has an annular corrugation 6 therein adjacent its end, which corrugation is adapted to cooperate with the clamp to prevent relative longitudinal displacement between the clamp and pipe. Therefore the band 1 is provided wtih a similar annular corrugation 7, which seats against the corrugation 6 on the pipe 5.

To secure the ends of the band 1 together, there are mounted adjacent opposite ends of the band, yokes 8 and 9, respectively, which yokes contain bushings 10, 11, 12 and 13. The two bushings in each yoke are aligned with the bushings in the other yoke and bolts 14 and 15 equipped with nuts 16 and 17, respectively, extend through the bushings and secure them together.

The yokes 8 and 9, as shown in Figs. 4, 5, 6 and 7, are preferably stamped from sheet metal and comprise longitudinally spaced apart base portions 18 curved laterally to fit against the outer surface of the band 1 and curved portions 19 and 20, respectively, intermediate adjacent base portions 18. These curved portions 19 and 20 are substantially U-shaped having straight side walls 21 forming the leg portions of the U's and curved end portions 22 forming the bow of the U. Each of the yoke members 8 and 9 is rigidly permanently secured to the band 1 adjacent the opposite ends 3 and 4, respectively thereof by spot welding the base portions 18 to the band, as indicated at 23 in Fig. 2.

Figure 8:
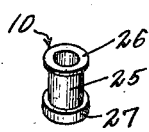
Fig. 8 is a perspective view of one of the bushing elements of the clamp.

The bushings 10, 11, 12 and 13 are all identical with each other and are constructed as shown in Fig. 8. Thus each comprises a hollow cylindrical section 25 having outwardly extending annular flanges 26 and 27 at opposite ends. The flange 27 at one end is substantially thicker axially of the bushing than the flange 26 at the other end, for a purpose to be described later.

The bushings 10, 11, 12 and 13 are inserted in the recesses defined by the bowed portions 19 and 20 of the yokes 8 and 9 prior to attachment of the yokes to the band 1. The bushings are so proportioned that the midportions 25 fit freely between the side arms 21 of the U-shaped portions of the yokes and the flanges 26 and 27 overlie the edges of the yokes to prevent escape of the bushings after the yokes have been secured to the band 1.

In the particular clamp shown in the drawing, the bowed portions 19 of the yokes are positioned alongside the annular corrugation 7 in the band 1 and for this reason the bowed portions 19 are made to project outwardly a greater distance from the surface of the band 1 than are the other bowed portions 20.

In the particular construction disclosed, it is desired that the band 1 be clamped tightly about the corrugated pipe section 5 so that the band is immovable with respect thereto. However, it is desired that the other pipe section 30 be slidably received within the band 1 to permit limited longitudinal motion. To this end, the clamp is adapted to be adjusted to a fixed diameter and retained in that condition. The thick and thin flanges 26 and 27, respectively, on the bushings 10, 11, 12 and 13 provide for this adjustment.

Thus the bushings 10 and 12, juxtaposed to the corrugation 7, are mounted with their thin flanges adjacent, as shown in Figs. 1 and 2. Preferably the peripheral length of the band 1 is so chosen with respect to the size of the pipe 5 that when the band is stretched tightly about the pipe 5, the adjacent ends of the bushings 10 and 12 are spaced apart. Therefore the tightness of the fit of the band 1 about the pipe 5 depends only on how tightly the nut 16 on bolt 14 is drawn up.

Figure 3:
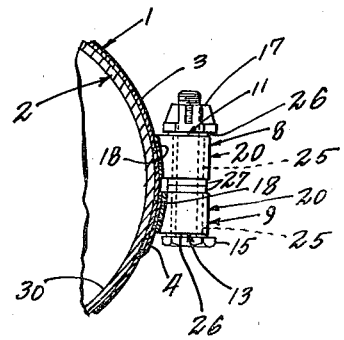
Fig. 3 is a detailed cross section, taken in the plane III—III of Fig. 2.

On the other hand, the bushings 11 and 13 are in reversed position as compared to the bushings 10 and 12, so that their thick flanges 27 are juxtaposed as shown in Figs. 2 and 3. The thickness of these flanges 27 is such with respect to the dimensions of the band 1 and the pipe 30 that when the nut 17 on bolt 15 is tightened sufficiently to bring the flanges 27 on the bushings 11 and 13 snugly together, as shown in Figs. 2 and 3, the desired fit between the band 1 and the pipe 30 is obtained.

Of course the flanges on the bushings 10 and 12 could both be thin since the thick flanges 27 on the outer ends of these bushings perform no particular function. However, by making the bushings with a thick flange 27 at one end and a thin flange 26 at the other end, as shown, the construction of all the bushings can be the same, thereby facilitating the manufacture and replacement, since only one type of bushing need be carried in stock.

The bowed sections 19 and 20 of the two yokes 8 and 9 are preferably made slightly deeper than is absolutely necessary to contain the bushings 10, 11, 12 and 13. This permits of sufficient adjusting movement of the bushings in the yokes to insure easy alignment of each pair of juxtaposed bushings with each other and with their cooperating bolts.

The clamp described is relatively inexpensive because of the extensive use therein of stamped metal construction, and it is also relatively light without the sacrifice of necessary strength. The stresses applied to the bowed portions 19 and 20 of the yokes are applied parallel to the wide dimension of the material so that there is great resistance to bending.

Although for the purpose of explaining the invention a particular embodiment thereof has been illustrated and described in detail, it is to be understood that various changes can be made from the particular construction shown and described without departing from the invention. As examples of variations that can be made, the yoke construction described is applicable to single bolt clamps as well as double bolt clamps. Furthermore, if it is desired to rigidly join two pipe members, then the bushings 11 and 13 would be reversed to bring their thin flanges together, or bushings having thin flanges on both ends might be employed. Conversely, if it were desired that the clamp engage both pipes loosely, then the clamp could be assembled with the thick flanges of the bushings 10 and 12 in contact with each other. Many other variations will occur to those skilled in the art, and the invention is to be limited only as set forth in the appended claims.

I claim:

1. A clamp for flexibly interconnecting adjacent ends of a pair of aligned pipe members, said clamp comprising a split sleeve encircling and enclosing the end portions of said pipe members, yoke means adjacent each peripheral end of said sleeve, each yoke means comprising a strip of metal extending axially across said sleeve and having base portions lying against and welded to said sleeve and having bowed portions intermediate said base portions, said bowed portions defining recesses adjacent opposite axial ends of said sleeve, a plurality of hollow cylindrical bushings, one in each of said recesses and each bushing having external end flanges engaging the edges of its associated strip, the bushings on one peripheral end of said split sleeve being aligned with the bushings on the opposite end of the sleeve and each pair of aligned bushings being interconnected by bolt means.

2. A clamp as described in claim 1, in which the flanges on the adjacent ends of one pair of interconnected bushings are relatively thick, whereby they abut against each other to limit contraction of the sleeve by the bolt means at one axial end of the sleeve, and the flanges on the adjacent ends of the other pair of interconnected bushings are relatively thin to permit greater contraction of the sleeve by the bolt means at the opposite axial end of the sleeves.

3. A clamp comprising a split sleeve, yoke means adjacent each peripheral end of said sleeve, each yoke means comprising a strip of metal extending axially across said sleeve and having base portions lying against and welded to said sleeve and having a bowed portion intermediate said base portions, said bowed portions defining recesses adjacent opposite axial ends of said sleeve, a plurality of hollow cylindrical bushings, one in each of said recesses and each bushing having external end flanges engaging the edges of its associated strip, the bushing on one peripheral end of said split sleeve being aligned with the bushing on the opposite end of the sleeve and the pair of aligned bushings being interconnected by bolt means.

WALLACE D. SMITH.